H. W. JACOBS.
PISTON.
APPLICATION FILED JAN. 13, 1911.
1,129,396.
Patented Feb. 23, 1915.
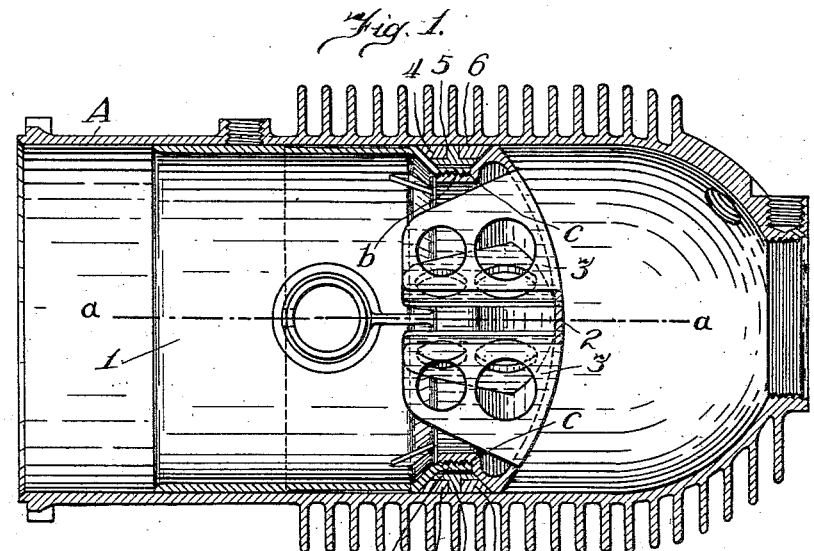
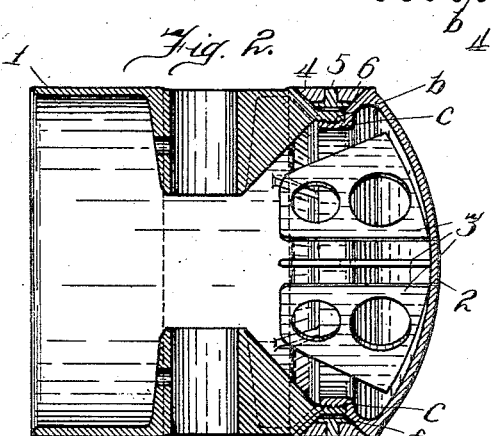
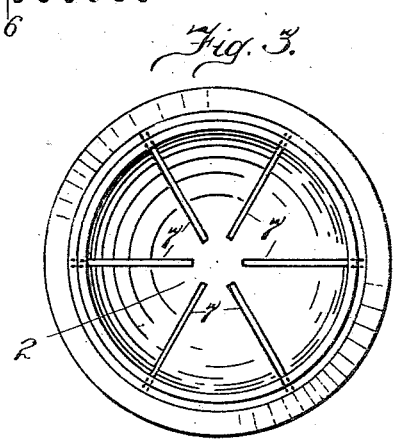
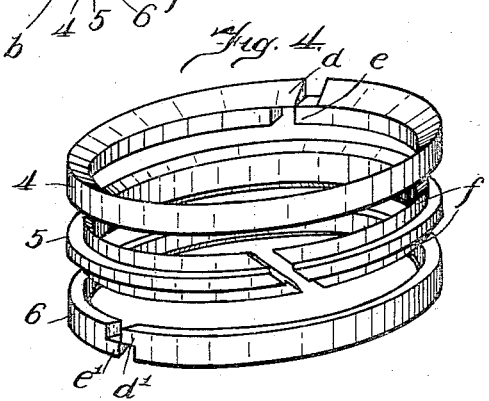
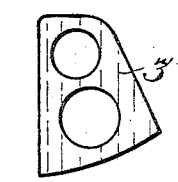

UNITED STATES PATENT OFFICE.

HENRY W. JACOBS, OF TOPEKA, KANSAS.

PISTON.

1,129,396. Specification of Letters Patent. Patented Feb. 23, 1915.

Application filed January 13, 1911. Serial No. 602,425.

*To all whom it may concern:*

Be it known that I, HENRY W. JACOBS, a citizen of the United States, and resident of Topeka, in the county of Shawnee and State of Kansas, have invented certain new and useful Improvements in Pistons, of which the following is a description, reference being had to the accompanying drawing, which forms a part of my specification.

My invention relates more particularly to an improvement in pistons for internal combustion engines; the object being to provide a piston which may be made as light in weight as possible and at the same time possess the requisite strength to adapt it for use more especially in connection with a four-cycle internal combustion engine; the piston being provided with a non-leakable packing.

A further object of my invention is to provide the piston with means for air cooling the piston, as will more fully appear from the following detailed description.

In the drawings: Figure 1 illustrates my improved piston within a horizontal air cooled cylinder, the piston and cylinder being shown in vertical cross section with the piston rod omitted. Fig. 2 is a horizontal cross section taken through the piston on the line a—a of Fig. 1. Fig. 3 is a plan view of the piston head looking at it from the crank side, with the cooling fins omitted and showing the slots into which they are inserted. Fig. 4 is a perspective view of the composite packing, the different rings or parts thereof being shown slightly separated in order to more clearly illustrate their construction. Fig. 5 is a plan view of one of the cooling fins inserted in the piston head.

I have illustrated my improved piston inserted in what is known as a horizontal air cooled cylinder A, in Fig. 1; the cylinder being shown provided with heat-radiating portions or fins.

My improved piston consists of the cylindrical guide portion 1, preferably made of cast iron; the spherical head 2, preferably made of steel, and the inwardly projecting fins 3. The cylindrical guide 1 is beveled or tapered at its one end so as to provide the reduced and threaded portion $b$, while the head 2 is provided with the reduced annular portion $c$ which is threaded to take into the threaded portion of the cylindrical guide 1. The head 2 adjacent to the reduced portion $c$ is beveled in the opposite direction from the bevel or the guide 1, thereby providing a socket or pocket for the reception of the packing.

I prefer to employ a composite packing comprising the three members or split rings 4, 5, and 6, preferably made of cast iron. The members or rings 4 and 6 are preferably split so as to provide the overlapping portions $d$ and $e$ and $d'$ and $e'$, see Fig. 4; while the intermediate member 5 is preferably split in the diagonal manner clearly shown in Fig. 4. The intermediate member or split ring 5 is provided at its inner circumference with the flange portion $f$ extending to opposite sides of the main or body portion thereof, so as to form an inverted T in cross section, as clearly shown in Figs. 1 and 2; the members or rings 4 and 6 being intended to take against the body portion of the ring or member 5 and about the flange-portion $f$ as clearly shown in the drawing, Figs. 1 and 2; the assembled or composite packing being of trapezoid shape in cross section, see Figs. 1 and 2. By employing a composite packing, of the character described, composed of separate split rings, it is apparent that the joints in the respective members or rings may be arranged at different points on the circumference of the composite packing, thereby enabling the making of a comparative gas or vapor tight joint. The assembled or composite packing is placed in the socket or pocket intermediate of the body of the cylindrical guide 1 and the head 2 as clearly shown. In operation, the spherical head 2 is subjected to pressure during the compression and expansion strokes, which tends to expand it slightly, thereby compressing the packing and compelling it to expand so that a gas or vapor tight joint is formed; while during the expansion and suction strokes of the piston, the pressure is relieved from the spherical head 2, allowing it to contract slightly, and thus in turn releasing the packing, permitting it to contract. This contraction and release of the packing will of course reduce the piston friction to a minimum.

I have shown and described the head 2 taking into the reduced end of the guide 1, for the reason that the expansion of steel is greater than that of cast iron; the method of construction shown and described therefore enables a perfectly tight union being made between the guide and head. Furthermore, with the piston guide 1 and packing rings 4, 5, and 6 made of cast iron and the spherical head 2 of steel, the greatest strength and, at the same time, lightness are obtained. By thus constructing the device, it is apparent that the frictional surfaces will be of cast iron, while the head, where strength is mostly desired, will be of steel.

The inside or concaved surface of the head 2 is provided with the additional radiating surface or means composed of the fins 3, of which any suitable number may be employed. I prefer to arrange these fins 3 in the radially extending manner illustrated in Figs. 1 and 2; and they are preferably made of machined steel. These fins or cooling members may either be cast integral with the head 2 or welded thereto. I prefer, however, to provide the head 2 with the radially extending slots 7, see Fig. 3, into which the cooling members or fins 3 are inserted and preferably autogenously welded in place. The fins 3 are preferably made of the form or shape more clearly illustrated in Fig. 5, so as to adapt them to the contour of the inner circumference of the guide 1.

The head 2 and the cooling members or fins 3 are preferably machined, and the fins preferably secured in place as above described, although they may be secured in any other suitable manner. This method of construction insures uniformity and lightness which are quite essential in high speed internal combustion engines. By providing the cooling members or fins on the inside or concaved face of the head 2, it is evident that the heat will be radiated or carried off into and toward the opposite end of the guide 1.

In constructing the concavo-convex circular head 2 and the end of the cylindrical guide 1 with the beveled surfaces as previously described, it is apparent that a wedge-shape circumferential groove is provided. The outer side surfaces of both rings 4 and 6 are made sloping or beveled to correspond with the beveled or sloping side walls of the groove as is clearly shown in Figs. 1 and 2, and by the top surface of the ring 4 in Fig. 4. It is apparent from the construction shown and described, that the intermediate member or ring 5 of the packing, when the parts are assembled and in place, supports the other members or rings 4 and 6.

By constructing my improved piston in the manner shown and described, it enables the same being machined all over, thereby insuring uniformity throughout in addition to great strength and lightness.

I have shown the piston-head provided with ramifications or protruding surfaces on its one side and these surfaces provided with openings therethrough, but it is apparent that the character and method of forming these radiating surfaces, as well as a number of minor details, may be altered without departing from the spirit of my invention, and I do not wish to be understood therefore as limiting myself to the exact construction shown and described, but

What I claim as my invention, and wish to secure by Letters Patent is:—

1. A composite metallic piston for internal combustion engines, comprising a cylindrical guide, a concavo-convex circular head, and a packing located at a point intermediate of the guide and head, the head being composed of metal having greater expansibility than that of the guide, the relation between the head and guide being such that the expansion and contraction of the head will control the frictional relation between the packing and the walls of the cylinder.

2. A piston for internal combustion engines, comprising a cylindrical guide, a spherical head of greater expansibility than the guide, adapted to take into one end of the guide, and a composite packing arranged about the juncture of the head and guide, the relation between the piston and the respective parts of the packing being such that the frictional relation between the packing and the inner wall of the cylinder is affected by the contraction and expansion of the head.

3. A composite piston for internal combustion engines, comprising a hollow guide portion, and a head portion of metal possessing greater expansibility than that of the guide portion, said portions being so secured together that the frictional relation between the head portion and the walls of the cylinder may vary during the respective strokes of the piston without affecting the connection between the guide portion and the head portion.

4. A composite piston for internal combustion engines, comprising a hollow guide portion, and a concavo-convex circular head portion of metal possessing relatively greater expansibility than that of the guide portion, the head portion being adapted to extend into the guide portion and so arranged that the frictional relation between the head portion and the walls of the cylinder may vary during the respective strokes of the piston and a tight connection between the two portions maintained.

5. A two-part piston for internal combustion engines, comprising a cylindrical guide of cast iron, and a spherical head of steel, said parts having reduced screw-threaded portions arranged to screw into each other so as to permit of unequal expansion without affecting the joint.

6. A composite piston for internal combustion engines, comprising a hollow guide-portion, and a spherical head portion of metal possessing greater expansibility than that of the guide-portion and arranged to dissipate heat toward the opposite end of the guide-portion, said portions being so secured together that the frictional relation between the head-portion and walls of the cylinder may vary during the respective strokes of the piston and a tight connection between said portions be maintained.

7. A composite piston for internal combustion engines, comprising a cylindrical guide-portion, and a concavo-convex head-portion of metal possessing greater expansibility than that of the guide-portion, the head-portion being so secured to the guide-portion that the frictional relation between the head-portion and the walls of the cylinder may vary during the respective strokes of the piston and a tight connection between the guide-portion and head portion maintained, the concaved side of the head-portion being provided with heat-dissipating portions.

8. A composite piston for internal combustion engines, comprising a hollow guide portion, and a concavo-convex head portion of metal possessing greater expansibility than that of the guide portion, the head portion being so secured to the guide portion that the head portion may expand and contract during the respective strokes of the piston and maintain a tight connection with the guide portion, the concaved side of the head portion being provided with radially arranged heat-radiating portions.

9. A piston for internal combustion engines, comprising a hollow guide member, and a concavo-convex head member, the adjacent ends of the two members being reduced so as to provide a packing receiving groove, the head member being of metal possessing relatively greater expansibility than that of the guide member and so secured thereto that the frictional relation between the head member and the walls of the cylinder may vary during the respective strokes of the cylinder while the connection between the two members is maintained, the concaved face of the head member being provided with radially extending heat-radiating portions.

HENRY W. JACOBS.

Witnesses:
 FRANK MITCHELL,
 H. LARIMER.